No. 801,250. PATENTED OCT. 10, 1905.
J. R. KEARNEY.
SUPPORTING CLAMP FOR ELECTRIC CONDUCTORS.
APPLICATION FILED DEC. 15, 1904.
2 SHEETS—SHEET 1.
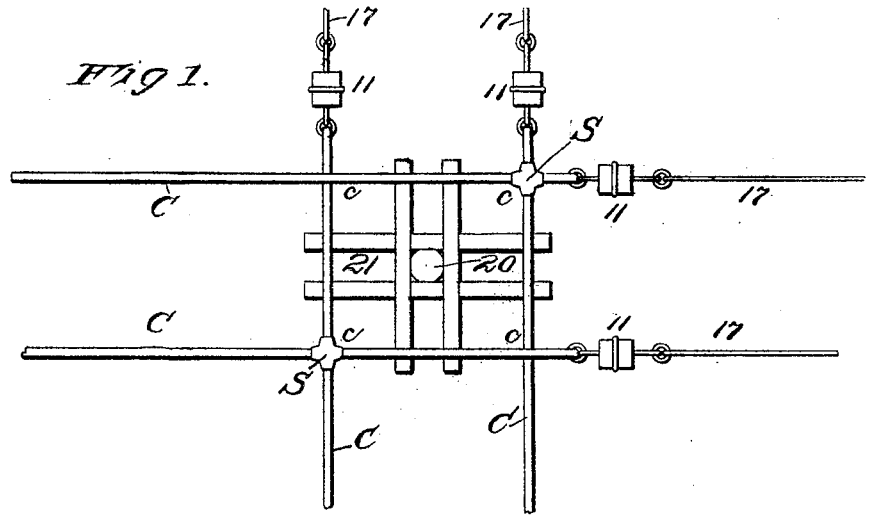
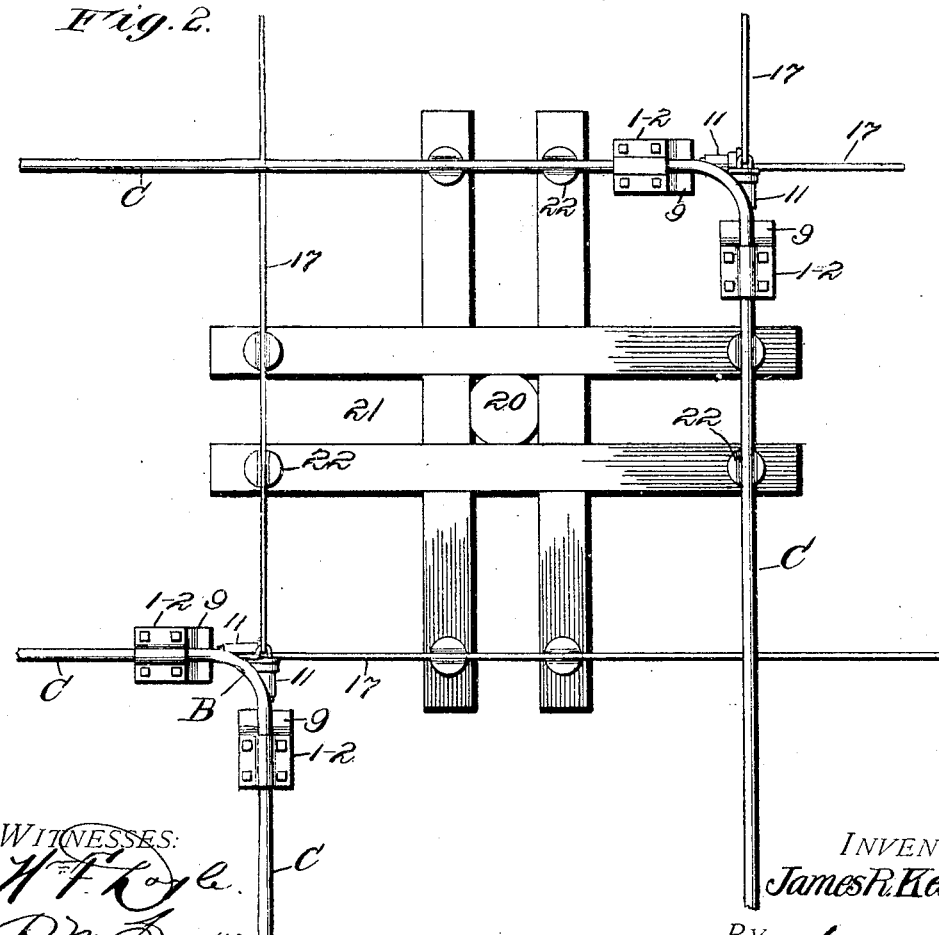

No. 801,250. PATENTED OCT. 10, 1905.
J. R. KEARNEY.
SUPPORTING CLAMP FOR ELECTRIC CONDUCTORS.
APPLICATION FILED DEC. 15, 1904.
2 SHEETS—SHEET 2.
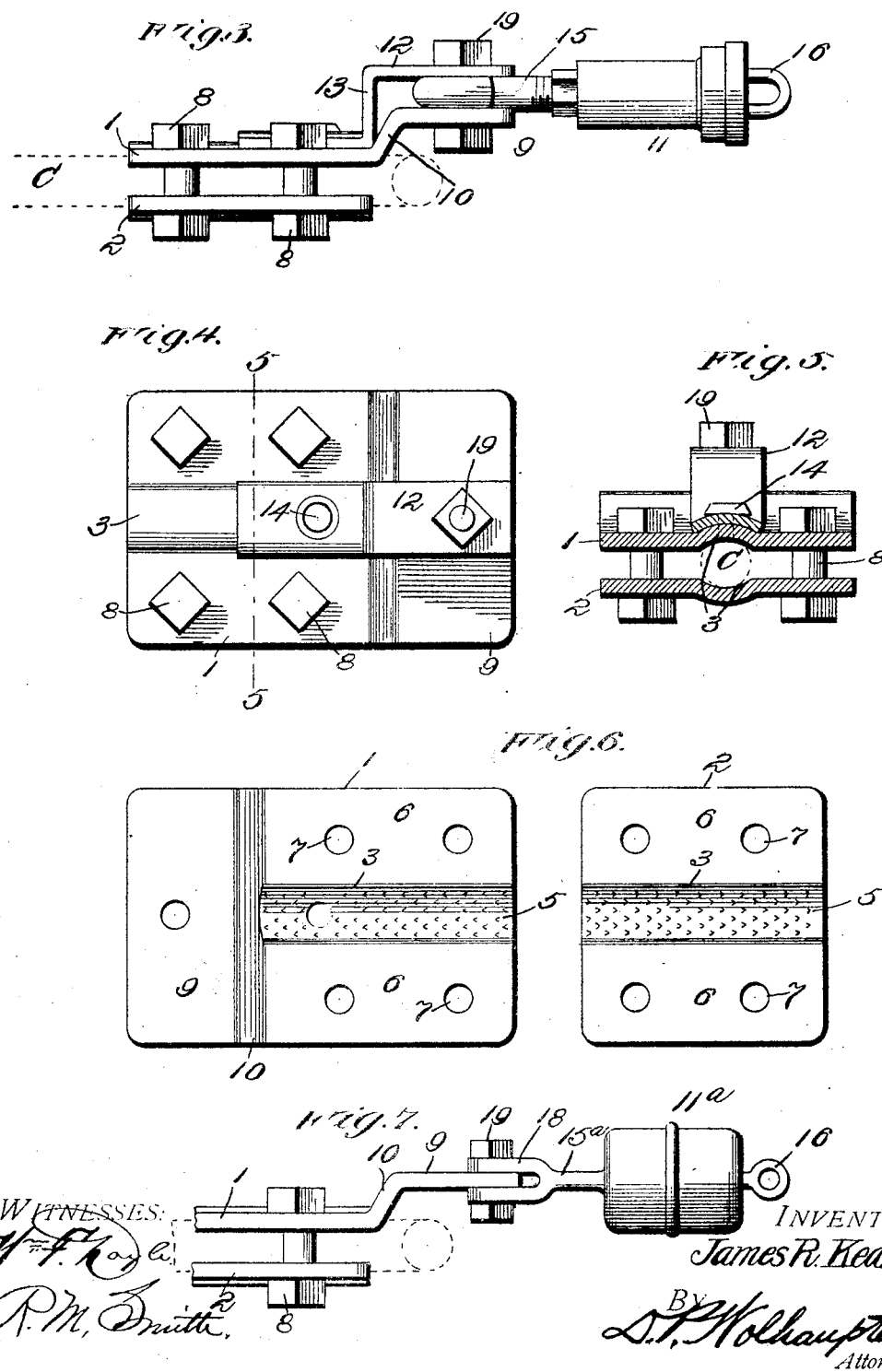

UNITED STATES PATENT OFFICE.

JAMES R. KEARNEY, OF TOPEKA, KANSAS.

SUPPORTING-CLAMP FOR ELECTRIC CONDUCTORS.

No. 801,250.　　　Specification of Letters Patent.　　　Patented Oct. 10, 1905.

Application filed December 15, 1904. Serial No. 236,989.

*To all whom it may concern:*

Be it known that I, JAMES R. KEARNEY, a citizen of the United States of America, residing at Topeka, in the county of Shawnee and State of Kansas, have invented certain new and useful Improvements in Supporting-Clamps for Electric Conductors, of which the following is a specification.

This invention relates to that type of inventions classified as "supports" and "hangers" for electrical conductors, and has special reference to an improved supporting-clamp designed for the support of electric cables and wires in overhead systems of wiring.

To this end the invention contemplates a simple and practical construction of clamp capable of being clamped upon the conductor with a powerful grip, while at the same time permitting a cable to make right-angle turns without cutting or splicing. In this connection the invention provides a form of clamp possessing special advantage in connection with the various types of strain-insulators which are associated with electric cables and their bracing-guys.

To this end the improved clamp permits a continuous running of the cable through the clamp while not interfering with the bracing of the clamp to accommodate angles and turns of the cable. This entirely obviates the crossing and splicing of the cable where right-angle turns are made, while at the same time the improved clamps give the cable its full conductivity, which is impossible in any splice-joint such as commonly resorted to in cable-hanging.

With these and other objects in view, which will more readily appear as the nature of the invention is better understood, the same consists in the novel construction, combination, and arrangement of parts, which will be hereinafter more fully described, illustrated, and claimed.

The essential features of the invention involved in the specific construction of the clamp and the novel means of hanging the same to permit of continuous right-angle turns of the cable without cutting or splicing are necessarily susceptible to structural change without departing from the scope of the invention; but a preferred exemplification thereof is shown in the accompanying drawings, in which—

Figure 1 is a diagrammatic plan view showing a common method of stringing electric cables in connection with strain-insulators. Fig. 2 is an enlarged plan view showing the improved method of stringing electric cables in connection with the improved clamps and the novel means of hanging the latter in connection with strain-insulators. Fig. 3 is a side view of one of the improved clamps shown associated with one type of strain-insulator. Fig. 4 is a top plan view of a clamp. Fig. 5 is a cross-sectional view on the line 5 5 of Fig. 4. Fig. 6 is an inside plan view of the two plates comprising the clamp. Fig. 7 is a detail view showing the adaptation of the clamp to another type of strain-insulator having its own clevis.

Like reference-numerals designate corresponding parts in the several figures of the drawings.

The clamp proper essentially comprises a pair of superposed clamping-plates 1 and 2, preferably of a duplicate formation in the particular of the wire gripping or clamping means. These members preferably consist of stout metal plates rolled, forged, or otherwise formed into shape, and the same are provided upon their inner faces with the longitudinally-disposed grooves 3, open throughout and at their ends and producing what may be properly termed "longitudinal conductor-seats" for receiving therein opposite side portions of the electrical cable or conductor.

The longitudinal seats 3 upon the inner faces of the opposite clamping members 1 and 2 are disposed directly opposite in complemental relation to constitute parts of the same channel or groove receiving the conductor. The surface of these grooves 3 is serrated or otherwise suitably roughened, as indicated by the reference-numeral 5, to provide definite gripping-surfaces for biting into and firmly engaging the wire or cable to prevent slipping of the clamp thereon.

At both sides of the longitudinal plane of the conductor-seats 3 the body portion of the clamp members or plates 1 and 2 are formed into the wide side bolt-flanges 6, provided therein with a plurality of bolt-holes 7, receiving the binding-bolts 8. These binding-bolts 8, disposed upon both sides of the conductor-seats and connecting the two members or plates, provide means whereby said members or plates may be tightened with a very strong binding grip upon the electrical conductor, thus permitting any reasonable amount of stress or stretching strain to be placed upon the conductor or the clamp without a relative slipping of the parts.

A distinctive feature of the present invention resides in associating with the clamp suitable means for hanging or supporting the conductor, and to provide for this one of the clamping members or plates (designated by the numeral 1) is provided at one end with the flange extension 9. This flange extension 9 is laterally offset from the body of the member or plate through the medium of an offsetting bend 10, so as to dispose the same wholly at one side of the longitudinal plane of the member 1, and hence wholly at one side of the plane of the cable or conductor passing through the clamp. The said flange extension constitutes what might be properly termed a "hanger-flange," with which is associated the means for supporting and positioning the electrical conductor. Also it is the purpose of the invention to have the hanger-flange 9 constitute a direct means of connection between the clamp and a strain-insulator, such as commonly employed in overhead systems of wiring.

In Fig. 3 of the drawings there is illustrated a strain-insulator designated in its entirety by the reference-number 11. This insulator is of a well-known construction and is designed to perform its individual functions as an insulator of this type; but in adapting this form of insulator to the improved clamp herein described it is preferable to associate with the clamp a supplemental clevis-strap 12, arranged above and parallel to the hanger-flange 9 and also having an offsetting bend 13, which disposes one arm of the strap upon the outer side of the clamping member or plate 1, to which member or plate the supplemental clevis-strap is secured through the medium of a rivet, screw, or equivalent fastening 14. The bifurcation between the strap 12 and the flange 9 is designed to receive the single connecting-rod 15 of the strain-insulator 11, and the eye 16 at the opposite end of said strain-insulator is designed to have secured thereto in the usual manner a bracing-guy 17, such as employed in overhead systems of wiring, as illustrated in Fig. 2 of the drawings.

Some types of strain-insulators do not require the supplemental clevis-strap for attachment to the improved supporting-clamp claimed herein. For instance, in Fig. 7 of the drawings there is shown a type of strain-insulator 11ª whose connecting-rod 15ª is formed at its outer end with a clevis 18 for receiving the bolt 19, connecting the same with the flange 9 of the clamp.

To accentuate the advantageous improvement in stringing electrical conductors, as provided for by the improved clamp, Fig. 1 of the drawings is shown to illustrate the old method. Referring to this figure of the drawings, 20 designates the pole carrying the usual cross-arms 21, upon which are supported the electrical cables or conductors C. These cables or conductors C are shown as being carried in pairs and making a right-angle turn upon the cross-arms 21. To accomplish this, the conductors are cut, forming two separate pairs at the point where the angle-turn is made upon the cross-arms 21. The separate pairs of cables are crossed at the point c and also at the points S are spliced through the medium of the usual spliced joint. Also in this arrangement the ends of the cables of each pair have connected thereto the strain-insulators 11, from which lead the bracing-guys 17.

The above arrangement of crossed and spliced cables is entirely obviated in carrying out the present invention. Referring to Fig. 2 of the drawings, it will be seen that instead of cutting and splicing the conductors and cables the same are left uncut and are simply bent at right angles and carried along continuously. To accomplish this, each cable or conductor has one of the improved clamps clamped thereon upon its straight portion at both sides of the bend B therein, thus disposing the two clamps upon each bent cable at right angles to each other. Each of said clamps upon each conductor has the strain-insulator and bracing-guy 17 connected therewith, as before referred to, and in this connection it is to be noted that it is only necessary to connect the guys 17 with the glass insulators 22, mounted upon the ends of the cross-arms 21 in the usual manner. Hence it will be seen that for each right-angle turn of the conductor there are employed a pair of right-angularly-disposed clamps and right-angularly-arranged strain-insulators and bracing-guys, as plainly shown in Fig. 2 of the drawings.

From the foregoing it is thought that the construction, operation, and many advantages of the herein-described improvement will be readily apparent without further description, and it will be understood that various changes in the form, proportion, and minor details of construction may be resorted to without departing from the spirit of the invention or sacrificing any of the advantages thereof. In this connection it will be readily understood that while special emphasis has been placed upon the adaptation of the clamps on cable corners the said clamps are useful as supporting-hangers in other positions—such, for instance, as on cable ends, where it would only be necessary to employ one clamp.

Having thus described the invention, what is claimed, and desired to be secured by Letters Patent, is—

1. A supporting-clamp for electric conductors comprising a pair of superposed clamping-plates, binding means connecting these plates, and a hanger connection disposed at one side of the plane of the conductor extending between the plates.

2. A supporting-clamp for electric conductors comprising a pair of superposed clamping members or plates having conductor-seats, binding means connecting these plates, and a hanger connection disposed at one side of the plane of the conductor extending between the plates.

3. A supporting-clamp for electric conductors comprising a pair of superposed clamping-plates, one of which is provided with a hanger connection, and binding means connecting the two plates.

4. A supporting-clamp for electric conductors comprising a pair of superposed clamping-plates formed with longitudinal conductor-seats and one of which is provided with a hanger connection, and binding means connecting the two plates.

5. A supporting-clamp for electric conductors, comprising a pair of superposed clamping members formed with conductor-seats and one of which is provided with a laterally-offset hanger connection, and binding means connecting the two members.

6. A supporting-clamp for electric conductors comprising a pair of superposed clamping members formed with longitudinally-disposed conductor-seats in their inner faces and one of which is provided at one end with a laterally-offset hanger-flange for the connection of a strain-insulator therewith, and a binding connection between the two plates.

7. A supporting-clamp for electric conductors comprising a pair of superposed clamping members formed with longitudinally-disposed conductor-seats having gripping-surfaces, one of said members being further provided at one end with a laterally-offset hanger-flange for the connection of a strain-insulator therewith, and binding-bolts connecting the two members at opposite sides of the plane of the seats.

8. A supporting-clamp for electric conductors comprising a pair of superposed clamping members having wire-gripping means and one of which is provided with a laterally-offset hanger-flange, a supplemental clevis-strap secured to one of the members and overlying the hanger-flange to receive the connecting-rod of a strain-insulator, and binding-bolts connecting the two members.

9. In combination with an electrical conductor having a right-angle bend, of supporting-clamps secured upon the conductor respectively at opposite sides of the bend thereof and each of which clamps is provided with a hanger connection, a strain-insulator secured to a bracing-guy leading from each insulator in line therewith.

10. In combination with an electrical conductor having a right-angle bend and the supporting cross-arms, of a pair of supporting-clamps clamped upon the conductor respectively at opposite sides of the bend thereof, said clamps being disposed at right angles to each other and each provided on one of its members with a hanger-flange, a strain-insulator connected with the flange of each clamp, and a bracing-guy leading from each insulator.

In testimony whereof I affix my signature in presence of two witnesses.

JAMES R. KEARNEY.

Witnesses:
W. S. McCLINTOCK,
E. ROOT.